(12) United States Patent
Lee et al.

(10) Patent No.: US 8,956,771 B2
(45) Date of Patent: Feb. 17, 2015

(54) ELECTRODE CATALYST FOR FUEL CELL, METHOD OF PREPARATION, MEA INCLUDING THE CATALYST, AND FUEL CELL INCLUDING THE MEA

(71) Applicants: Kang-hee Lee, Suwon-si (KR); Chan-ho Pak, Seoul (KR); Dae-jong Yoo, Seoul (KR); Seon-ah Jin, Pocheon-si (KR)

(72) Inventors: Kang-hee Lee, Suwon-si (KR); Chan-ho Pak, Seoul (KR); Dae-jong Yoo, Seoul (KR); Seon-ah Jin, Pocheon-si (KR)

(73) Assignee: Samsung SDI Co., Ltd., Yonging-si (KR)

( * ) Notice: Subject to any disclaimer, the term of this patent is extended or adjusted under 35 U.S.C. 154(b) by 0 days.

(21) Appl. No.: 13/624,208

(22) Filed: Sep. 21, 2012

(65) Prior Publication Data

US 2013/0078548 A1  Mar. 28, 2013

(30) Foreign Application Priority Data

Sep. 27, 2011  (KR) ......................... 10-2011-0097571

(51) Int. Cl.
| | |
|---|---|
| *H01M 4/36* | (2006.01) |
| *H01M 8/10* | (2006.01) |
| *H01M 4/92* | (2006.01) |
| *H01M 4/02* | (2006.01) |
| *H01M 4/88* | (2006.01) |
| *B01J 23/42* | (2006.01) |
| *B01J 23/44* | (2006.01) |

(52) U.S. Cl.
CPC ................ *H01M 4/88* (2013.01); *H01M 4/921* (2013.01); *H01M 4/926* (2013.01); *Y02E 60/50* (2013.01); *Y02E 60/522* (2013.01)
USPC ........... 429/405; 429/483; 429/484; 429/524; 429/525; 429/526; 429/527; 429/532; 429/535; 502/101; 502/339

(58) Field of Classification Search
None
See application file for complete search history.

(56) References Cited

U.S. PATENT DOCUMENTS

| 4,132,619 | A  | * | 1/1979  | Klein et al. ................... 204/242 |
|---|---|---|---|---|
| 2010/0015489 | A1 | * | 1/2010  | Gauthier et al. ................ 429/30 |
| 2010/0129728 | A1 | * | 5/2010  | Morimoto et al. ............ 429/483 |
| 2010/0151296 | A1 |   | 6/2010  | Lee et al. |
| 2011/0318662 | A1 | * | 12/2011 | Kremliakova et al. ........ 429/428 |

FOREIGN PATENT DOCUMENTS

| JP | 2006-202698 | 8/2006 |
|---|---|---|
| KR | 10-2006-0105957 | 10/2006 |
| KR | 10-0785052 | 12/2007 |
| KR | 10-2010-0069492 | 6/2010 |
| KR | 10-2011-0029573 | 3/2011 |

OTHER PUBLICATIONS

Suo et al. "First-Principles Considerations in the Design of Pd-Alloy Catalysts for Oxygen Reduction". Angew. Chem. 2007, 119, 2920-2922.

* cited by examiner

*Primary Examiner* — Sarah A Slifka
(74) *Attorney, Agent, or Firm* — Christie, Parker & Hale, LLP (57) ABSTRACT

An electrode catalyst for fuel cell, a method of preparing the electrode catalyst, a membrane electrode assembly including the electrode catalyst, and a fuel cell including the membrane electrode assembly. The electrode catalyst includes a crystalline catalyst particle incorporating a precious metal having oxygen reduction activity and a Group 13 element, where the Group 13 element is present in a unit lattice of the crystalline catalyst particle.

19 Claims, 9 Drawing Sheets

FIG. 9

ELECTRODE CATALYST FOR FUEL CELL, METHOD OF PREPARATION, MEA INCLUDING THE CATALYST, AND FUEL CELL INCLUDING THE MEA

CROSS-REFERENCE TO RELATED APPLICATION

This application claims the benefit of Korean Application No. 10-2011-0097571, filed Sep. 27, 2011 in the Korean Intellectual Property Office, the disclosure of which is incorporated herein by reference.

BACKGROUND

1. Field

Aspects of the present invention relate to electrode catalysts for a fuel cell, methods of preparing the same, and membrane electrode assemblies including the electrode catalysts, as well as fuel cells including the membrane electrode assemblies.

2. Description of the Related Art

According to types of electrolyte and fuel, a fuel cell can be categorized as a polymer electrolyte membrane fuel cell (PEMFC), a direct methanol fuel cell (DMFC), a phosphoric acid fuel cell (PAFC), a molten carbonate fuel cell (MCFC), a solid oxide fuel cell (SOFC), or the like.

Typically, a PEMFC and a DMFC each include a membrane-electrode assembly (MEA) that includes an anode, a cathode, and a polymer electrolyte membrane interposed between the anode and the cathode. The anode includes a catalyst layer for promoting oxidation of a fuel and the cathode includes a catalyst layer for promoting reduction of an oxidizing agent.

In general, as a component of the anode and the cathode, a catalyst including platinum (Pt) as an active element is used. However, the Pt-based catalyst is an expensive precious metal and the demand is still high for Pt for use in electrode catalysts in manufacturing a commercially available fuel cell on a large scale and thus a decrease in system costs is needed. Accordingly, there is a need to develop an electrode catalyst that reduces the amount of Pt and provides excellent battery performance.

SUMMARY

Aspects of the present invention provide electrode catalysts that are used in a fuel cell and provide excellent catalytic activities as well as providing methods of preparing the same.

Aspects of the present invention provide membrane electrode assemblies including the electrode catalysts and fuel cells including the membrane electrode assemblies.

An aspect of the present invention provides an electrode catalyst for a fuel cell that includes a crystalline catalyst particle comprising a precious metal having oxygen reduction activity and a Group 13 element, wherein the Group 13 element is present in a unit lattice of the crystalline catalyst particle.

The electrode catalyst may satisfy at least one of Equations 1 to 3 below:

$$D_2(X) > D_1(X) \qquad <\text{Equation 1}>$$

$$D_2(Y) > D_1(Y) \qquad <\text{Equation 2}>$$

$$D_2(Z) > D_1(Z) \qquad <\text{Equation 3}>$$

wherein in Equations 1 to 3, $D_2(X)$, $D_2(Y)$, and $D_2(Z)$ respectively indicate distances parallel to the X-axis, the Y-axis, and the Z-axis among distances between crystal surfaces of the unit lattice of the crystalline catalyst particle that are parallel to each other, $D_1(X)$, $D_1(Y)$ and $D_1(Z)$ respectively indicate distances parallel to the X-axis, the Y-axis, and the Z-axis among distances between crystal surfaces of the unit lattice of a first catalyst particle which are parallel to each other, and the first catalyst particle has the same structure as the crystalline catalyst particle except that the Group 13 element is not included therein.

The electrode catalyst may satisfy Equation 4 below:

$$A_2 > A_1 \qquad <\text{Equation 4}>$$

wherein in Equation 4, $A_2$ is a lattice constant of the crystalline catalyst particle and $A_1$ is a lattice constant of a first catalyst particle that has the same structure as the crystalline catalyst particle except that the Group 13 element is not included therein.

The electrode catalyst may further include a carbonaceous support.

Another aspect of the present invention provides a method of preparing an electrode catalyst for a fuel cell, the method comprising: providing a mixture including a precursor of a precious metal having an oxygen reduction activity and a precursor of a Group 13 element; and reducing the precursors in the mixture to form an electrode catalyst that is used in a fuel cell and comprises a crystalline catalyst particle including a Group 13 element and a precious metal having oxygen reduction activity, wherein the Group 13 element is present in a unit lattice of the crystalline catalyst particle.

Another aspect of the present invention provides a membrane electrode assembly for a fuel cell including: a cathode; an anode disposed facing the cathode; and an electrolyte membrane interposed between the cathode and the anode, wherein at least one of the cathode and the anode comprises the electrode catalyst. The cathode may include the electrode catalyst.

Another aspect of the present invention provides a fuel cell comprising the membrane assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As used herein, the term "and/or" includes any and all combinations of one or more of the associated listed items. Expressions such as "at least one of," when preceding a list of elements, modify the entire list of elements and do not modify the individual elements of the list. Moreover, it is to be understood that where is stated herein that one layer is "formed on" or "disposed on" a second layer, the first layer may be formed or disposed directly on the second layer or there may be an intervening layer between the first layer and the second layer.

An electrode catalyst for a fuel cell (hereinafter also referred to as "electrode catalyst") according to an embodiment of the present invention includes a crystalline catalyst particle including a Group 13 element and a precious metal having oxygen reduction activity and. In this regard, the Group 13 element is present inside a unit lattice of the crystalline catalyst particle.

The crystalline catalyst particle may be a crystalline alloy formed by completely reducing the precious metal and the Group 13 element in the course of synthesizing the crystalline catalyst particle. Accordingly, the crystalline catalyst particle may not have a significant concentration of the oxide of the precious metal and/or an oxide of the Group 13 element and thus has excellent oxygen reduction activity. Accordingly, the crystalline catalyst particle may be effectively used as an electrode catalyst for a fuel cell, for example, a catalyst for a cathode.

The precious metal may have oxygen reduction activity. The precious metal may include at least one selected from the group consisting of palladium (Pd), iridium (Ir), gold (Au), platinum (Pt), rhenium (Re), osmium (Os), ruthenium (Ru), rhodium (Rh), and silver (Ag). For example, the precious metal may include palladium (Pd). Also, the precious metal may include platinum (Pt). Also, the precious metal may include palladium (Pd) and iridium (Ir). However, the precious metal is not limited thereto.

The Group 13 element may improve the oxygen reduction activity of the crystalline catalyst particle by changing the crystal structure or electronic structure of the precious metal. For example, the Group 13 element may include at least one of boron (B), aluminum (Al), gallium (Ga), indium (In), and thallium (Tl). For example, the Group 13 element may include at least one of boron (B) and indium (In), but is not limited thereto.

The crystalline catalyst particle may further include a transition metal. The transition metal may be alloyed with the precious metal, and thus the electron density of the precious metal is changed. Thus, the adsorption bond of the precious metal with oxygen weakens, and the catalytic activity of the electrode catalyst is improved.

The transition metal may include at least one of cobalt (Co), copper (Cu), iron (Fe), nickel (Ni), manganese (Mn), cerium (Ce), and titanium (Ti). For example, the transition metal may include at least one of cobalt (Co), copper (Cu), and manganese (Mn), but is not limited thereto.

The crystalline catalyst particle of the electrode catalyst for a fuel cell may satisfy at least one of Equations 1 to 3 due to the inclusion of the Group 13 element:

$$D_2(X) > D_1(X) \qquad \text{<Equation 1>}$$

$$D_2(Y) > D_1(Y) \qquad \text{<Equation 2>}$$

$$D_2(Z) > D_1(Z) \qquad \text{<Equation 3>}$$

wherein, in Equations 1 to 3, $D_2(X)$, $D_2(Y)$, and $D_2(Z)$ respectively indicate distances parallel to an X-axis, a Y-axis, and a Z-axis among distances between crystal surfaces of the unit lattice of the crystalline catalyst particle which are parallel to each other, $D_1(X)$, $D_1(Y)$ and $D_1(Z)$ respectively indicate distances parallel to an X-axis, a Y-axis, and a Z-axis among distances between crystal surfaces of the unit lattice of a first catalyst particle which are parallel to each other, and the first catalyst particle has the same structure as the crystalline catalyst particle except that the Group 13 element is not included therein.

Figure 1A:
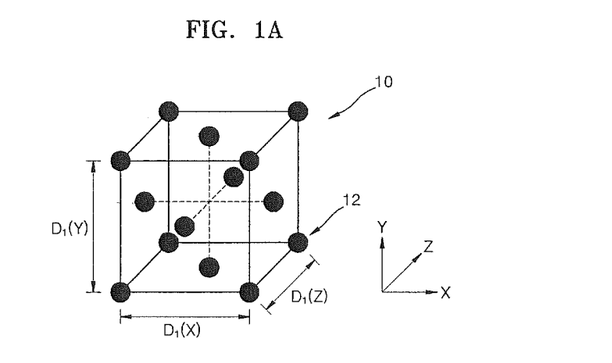
FIG. 1A is a schematic diagram of a unit lattice of a crystalline catalyst of an electrode catalyst without a Group 13 element of the present invention.
Figure 1B:
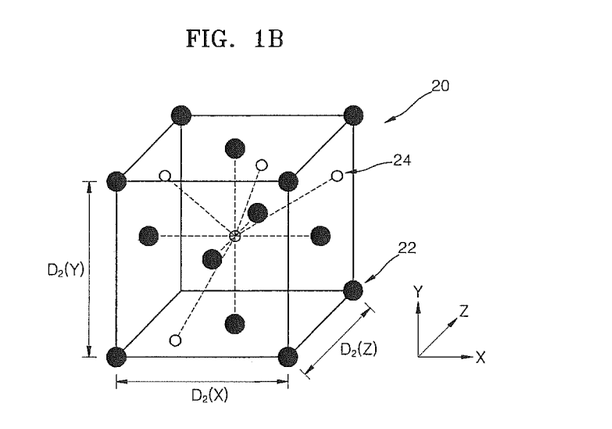
FIG. 1B is a schematic diagram of a unit lattice of a crystalline catalyst particle of an electrode catalyst according to an embodiment of the present invention.

Equations 1 to 3 may be easily understood with reference to FIGS. 1A and 1B. FIG. 1B is a schematic diagram of a unit lattice 20 of the crystalline catalyst particle of the electrode catalyst (hereinafter referred to as "the unit lattice 20") according to an embodiment of the present invention and FIG. 1A is a schematic diagram of a unit lattice 10 of the first catalyst particle (hereinafter referred to as "the unit lattice 10") having the same structure as the unit lattice 20 illustrated in FIG. 1B, except that the Group 13 element is not included.

The unit lattice 20 and the unit lattice 10 respectively include atoms 22 and 12 of the precious metal or transition metal described above, which are regularly arranged. The unit lattice 20, unlike the unit lattice 10, includes an atom 24 of the Group 13 element in the unit lattice 20. The atom 24 of the Group 13 element may be present between the atoms 22 of the precious metal or transition metal that form the unit lattice 20.

Due to the inclusion of the atom 24 of the Group 13 into the unit lattice 20, the distance(s) between crystal surfaces that are parallel to each other ($D_2(X)$, $D_2(Y)$ and $D_2(Z)$) in the unit lattice 20 may be longer than a distance (s) between crystal surfaces that are parallel to each other ($D_1(X)$, $D_1(Y)$ and $D_1(Z)$) in the unit lattice 10.

For example, the distance that is parallel to the X-axis among crystal surfaces that are parallel to each other in the unit lattice 20 ($D_2(X)$) may be longer than the distance that is parallel to the X-axis among crystal surfaces that are parallel to each other in the unit lattice 10 ($D_1(X)$). That is, Equation 1 may be satisfied.

For example the distance that is parallel to the Y-axis among crystal surfaces that are parallel to each other in the unit lattice 20 ($D_2(Y)$) may be longer than the distance that is parallel to the Y-axis among crystal surfaces that are parallel to each other in the unit lattice 10 ($D_1(Y)$). That is, Equation 2 may be satisfied.

For example, the distance that is parallel to the Z-axis among crystal surfaces that are parallel to each other in the unit lattice 20 ($D_2(Z)$) may be longer than the distance that is parallel to the Z-axis among crystal surfaces that are parallel to each other in the unit lattice 10 ($D_1(Z)$). That is, Equation 3 may be satisfied.

For example, the electrode catalyst for a fuel cell may satisfy two or more of Inequalities 1 to 3 simultaneously.

Also, the electrode catalyst including the crystalline catalyst particle may satisfy Equation 4 below:

$$A_2 > A_1 \qquad \text{<Equation 4>}$$

wherein in Equation 4, $A_2$ is a lattice constant of the crystalline catalyst particle and $A_1$ is a lattice constant of the first catalyst particle that has the same structure as the crystalline catalyst particle except that the Group 13 element is not included therein.

A lattice constant may be obtained by, for example, evaluating an XRD pattern obtained by diffraction with Kα1 of Cu with respect to the electrode catalyst.

As confirmed with Equations 1 to 4, the insertion of an atom of the Group 13 element into a unit lattice of the crystalline catalyst particle leads to an increase in the distance between crystal surfaces of the crystalline catalyst particle and the lattice constant, so that the crystal structure and/or electron structure of the crystalline catalyst particle is changed. In detail, the atom of the Group 13 element changes the density of outer electrons of the precious metal in the unit lattice of the crystalline catalyst particle to change the reactivity of the catalyst particle with oxygen. Accordingly, a fuel cell employing the electrode catalyst including the crystalline catalyst particle described above may have excellent electrical performance.

The electrode catalyst may further include, in addition to the crystalline catalyst particle described above, a carbonaceous support. If the electrode catalyst further includes a carbonaceous support, the crystalline catalyst particle may be supported by the carbonaceous support.

The carbonaceous support may be selected from electrically conductive materials. For example, the carbonaceous support may be carbon black, graphite carbon, carbon nanotube, carbon fiber, or the like, but is not limited thereto, and these materials may be used alone or two or more of these may be used in combination.

If the electrode catalyst further includes a carbonaceous support, the amount of the crystalline catalyst particle may be in a range of about 10 parts by weight to about 80 parts by weight, for example, about 30 parts by weight to about 70 parts by weight, or about 40 parts by weight to about 60 parts by weight, based on 100 parts by weight of the electrode catalyst including the carbonaceous support. If the ratio of the crystalline catalyst particle to the carbonaceous support satisfies the ranges described above, the electrode catalyst particle may have excellent specific area characteristics and a relatively high amount of the electrode catalyst particle may be supported.

The amount of the Group 13 element may be in a range of about 0.001 to about 20 parts by weight, for example, about 0.01 parts by weight to about 13 parts by weight, based on 100 parts by weight of the electrode catalyst for a fuel cell. If the amount of the Group 13 element is within the ranges described above, excellent oxygen reduction activity may be obtained.

A method of manufacturing the electrode catalyst for a fuel cell will now be described in detail. First, a mixture is prepared, the mixture including a precursor of the precious metal having oxygen reduction activity and a precursor of the Group 13 element. If the crystalline catalyst particle includes at least two different precious metals, precursors of the at least two different precious metals may be used.

The precursor of the precious metal may include at least one of chlorides, nitrides, cyanides, sulfides, bromides, nitrates, acetates, sulfates, oxides, hydroxides, salts of oxygen acids, alkoxide salts, and cyanates, each of which includes the precious metal described above.

For example, if the precious metal includes palladium, the palladium precursor may include at least one of palladium nitride, palladium chloride, palladium sulfide, palladium acetate, palladium acetylacetonate, palladium cyanate, palladium isopropyl oxide, palladium nitrate, and palladium butoxide, but is not limited thereto.

The precursor of the Group 13 element may include at least one of chlorides, nitrides, cyanides, sulfides, bromides, nitrates, acetates, sulfates, oxides, hydroxides, salts of oxygen acids, and alkoxides, each of which includes the Group 13 element described above.

For example, the precursor of the Group 13 element may include at least one of $H_3BO_3$, $In(OH)_3$, and $InCl_3$, but is not limited thereto.

The mixture may further include, in addition to the precursor of the precious metal and the precursor of the Group 13 element, a precursor of the transition metal. If the electrode catalyst includes at least two different transition metals, precursors of the at least two different precious metal may be used.

The precursor of the transition metal may include at least one of chlorides, nitrides, cyanides, sulfides, bromides, nitrates, acetates, sulfates, oxides, hydroxides, and alkoxides, each of which includes the transition metal described above.

For example, the transition metal precursor may include at least one of nitrides, chlorides, sulfides, acetates and acetylacetonates (for example, copper acetate, iron acetate, cobalt acetate, nickel acetate, copper acetylacetonate, iron acetylacetonate, cobalt acetylacetonate, nickel acetylacetonate, or the like), cyanides, oxides (for example, copper isopropyloxide, iron isopropyloxide, cobalt isopropyloxide, nickel isopropyloxide, or the like), and alkoxides (for example, copper butoxide, iron butoxide, cobalt butoxide, nickel butoxide, or the like) of titanium(Ti), vanadium (V), chromium (Cr), manganese (Mn), iron (Fe), cobalt (Co), nickel (Ni), copper (Cu), and zinc (Zn), but is not limited thereto. For example, if the transition metal is Cu, the transition metal precursor may be a copper chloride, such as $CuCl_2 \cdot 2H_2O$.

The mixture may further include, in addition to the precursor of the precious metal and the precursor of the Group 13 element (and, optionally, the transition metal precursor), a carbonaceous support. If the mixture further includes a carbonaceous support, an electrode catalyst including the carbonaceous support and the crystalline catalyst particle supported by the carbonaceous support may be obtained.

The mixture may further include, in addition to the precursor of the precious metal and the precursor of the Group 13 element (and, optionally, the transition metal precursor), a solvent that may dissolve these precursors. Examples of the solvent are a glycol-based solvent, such as ethylene glycol, 1,2-propylene glycol, 1,3-butanediol, 1,4-butanediol, neopentyl glycol, diethylene glycol, 3-methyl-1,5-pentanediol, 1,6-hexanediol, trimethylol propane, or the like; and an alcohol-based solvent, such as methanol, ethanol, isopropyl alcohol (IPA), butanol, or the like. However, the solvent is not limited thereto and any one of various known solvents that dissolve the precursors may be available herein.

The amount of the solvent may be in a range of about 15,000 to about 100,000 parts by weight based on 100 parts by weight of the precursor of the precious metal. If the amount of the solvent is within the range described above, when the precious metal precursor is included in the mixture, a uniform metal alloy may be formed, and when the mixture further includes a carbonaceous support, dispersability of the crystalline catalyst particle in the carbonaceous support may be improved.

The mixture may further include a chelating agent (for example, ethylene diamine tetraacetate (EDTA)) for reducing the precious metal precursor (and, optionally, the transition metal precursor) simultaneously, a pH controller (for example, NaOH aqueous solution), or the like.

Subsequently, the precursors in the mixture are reduced to form the electrode catalyst for use in a fuel cell and include the crystalline catalyst particle including the Group 13 element and the precious metal having oxygen reduction activity, wherein the Group 13 element is present inside the unit lattice. Herein, if the mixture includes a carbonaceous support, an electrode catalyst in which the crystalline catalyst particle is supported by the carbonaceous support may be obtained.

The reducing of the precursors in the mixture may be performed by adding a reducing agent to the mixture.

The reducing agent may be selected from materials that reduce the precursors included in the mixture. For example, the reducing agent may be hydrazine ($NH_2NH_2$), sodium borohydride ($NaBH_4$), formic acid, or the like, but is not limited thereto. The amount of the reducing agent may be in a range of about 1 to about 3 mol based on 1 mol of the precious metal precursor. If the amount of the reducing agent is within the range described above, a satisfactory reduction reaction may be obtained.

The reduction of the precursors in the mixture may vary according to the type and amount of the precursor. For example, the reduction may be performed at a temperature of about 30° C. to about 80° C., for example, about 50° C. to about 70° C.

A membrane electrode assembly (MEA) for a fuel cell according to an embodiment of the present invention includes an electrolyte membrane interposed between a cathode and an anode that face each other, wherein the cathode includes the electrode catalyst for a fuel cell described above.

A fuel cell according to an embodiment of the present invention includes an MEA and separators on opposite sides of the MEA. The MEA includes an electrolyte membrane interposed between a cathode and an anode, wherein at least one of the cathode and the anode may include the electrode catalyst described above.

The fuel cell may be embodied as, for example, a polymer electrolyte membrane fuel cell (PEMFC), a phosphoric acid fuel cell (PAFC), or a direct methanol fuel cell (DMFC).

Figure 2:
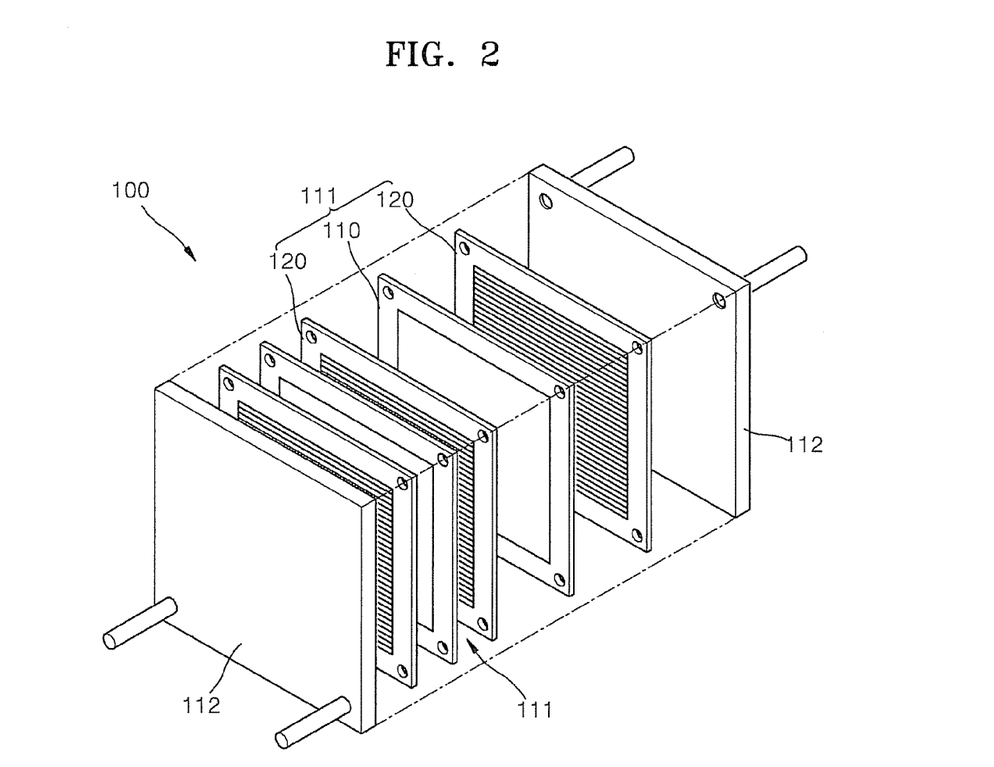
FIG. 2 is an exploded perspective view of a fuel cell according to an embodiment of the present invention.
Figure 3:
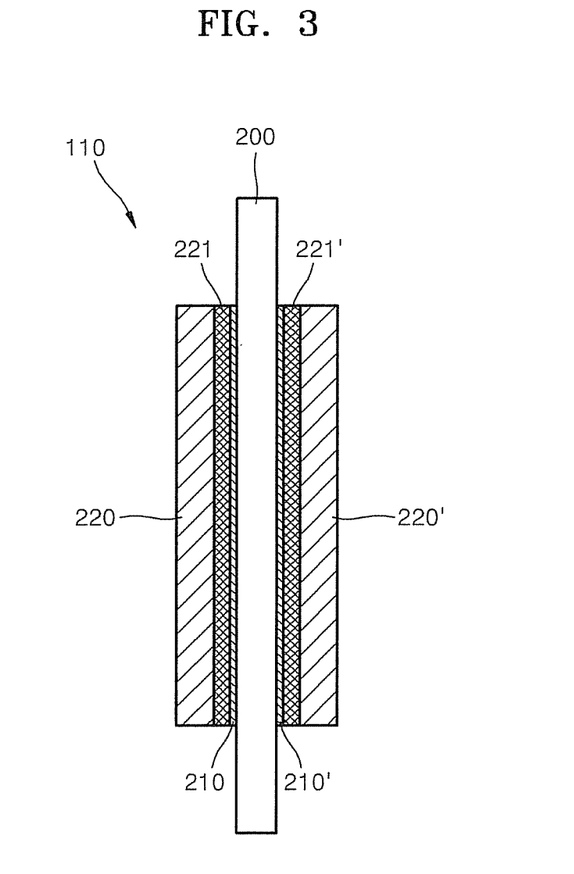
FIG. 3 is a schematic cross-sectional view of a membrane-electrode assembly (MEA) of the fuel cell of FIG. 2.

FIG. 2 is an exploded perspective view of a fuel cell 100 according to an embodiment of the present invention. FIG. 3 is a schematic cross-sectional view of an MEA of the fuel cell 100 of FIG. 2.

The fuel cell 100 of FIG. 2 includes two unit cells 111 that are interposed between a pair of holders 112. Each of the unit cells 111 includes an MEA 110 and bipolar plates 120 disposed on opposite sides of the MEA 110 in the thickness direction of the MEA 110. The bipolar plates 120 may each include metal having conductivity or carbon and may contact the MEA 110, so that the bipolar plates 120 function as current collectors and supply oxygen and a fuel to a catalyst layer of the MEA 110.

Also, although the fuel cell 100 of FIG. 2 includes two unit cells 111, the number of unit cells is not limited to 2 (two). For example, according to characteristics required by a fuel cell, the number of unit cells may be increased up to tens to hundreds.

The MEA 110 may include, as illustrated in FIG. 3, an electrolyte membrane 200, catalyst layers 210 and 210' that are disposed on opposite sides of the electrolyte membrane 200 in the thickness direction of the electrolyte membrane 200, first gas diffusion layers 221 and 221' deposited on the catalyst layers 210 and 210', respectively, and second gas diffusion layers 220 and 220' deposited on the first gas diffusion layers 221 and 221', respectively, wherein one of the catalyst layers 210 and 210' includes an electrode catalyst according to an embodiment of the present invention.

The catalyst layers 210 and 210' may function as a fuel electrode and an oxygen electrode, each of which includes a catalyst and a binder and may further include a material that increases the electrochemical surface area of the catalyst.

The first gas diffusion layers 221 and 221' and the second gas diffusion layers 220 and 220' may each include, for example, carbon sheet, carbon paper, or the like, and may diffuse oxygen and a fuel supplied through the bipolar plates 120 to whole surfaces of the catalyst layers 210 and 210'.

The fuel cell 100 including the MEA 110 operates at a temperature of about 100 to about 300° C. A fuel, for example, hydrogen may be supplied to one of the catalyst layers 210 and 210' through the bipolar plate 120 and an oxidizing agent, for example, oxygen may be supplied to the other catalyst layer through the bipolar plate 120. Also, at one of the catalyst layers 210 and 210', hydrogen may be oxidized to generate a hydrogen ion ($H^+$) and then the hydrogen ion ($H^+$) conducts through the electrolyte membrane 200 and reaches the other catalyst layer, and at the other catalyst layer, the hydrogen ion ($H^+$) electrochemically reacts with oxygen to generate water ($H_2O$) and electric energy. Also, the hydrogen supplied as a fuel may be hydrogen that is generated by reforming a hydrocarbon or an alcohol and also, the oxygen supplied as an oxidizing agent may be supplied as oxygen included in air.

One or more embodiments will now be described in further detail with reference to the following examples. These examples are for illustrative purpose only and are not intended to limit the scope of the one or more embodiments.

EXAMPLE

Example 1

Preparation of Pd—B/C Catalyst 50 g of 0.1 wt % $Pd(NO_3)_2$ aqueous solution and 50 g of 0.1 wt % $H_3BO_3$ aqueous solution were mixed to prepare a precursor mixture.

Separately, 0.5 g of KB (carbon black, 800 m²/g) as a carbonaceous support was dispersed in 100 g of $H_2O$ to prepare a carbonaceous support mixture.

The precursor mixture and the carbonaceous support mixture were mixed and then 10.5 g of 1M NaOH aqueous solution was added thereto, followed by stirring for 30 minutes to prepare a mixture having a pH of 10 to 11. Then, an $NaBH_4$ aqueous solution was added thereto to form a Pd—B catalyst particle on the carbonaceous support by reduction. The resultant product was filtered, washed, and dried to prepare a Pd—B/C catalyst in which, theoretically (by calculation), a 50 wt % of a Pd—B catalyst particle was supported by the carbonaceous support. That is, B was now present in the Pd unit lattice at an atomic ratio of Pd:B at 20:1.

Example 2

Preparation of $Pd_2Ir$—B/C Catalyst

A $Pd_2Ir$—B/C catalyst, in which a 50 wt % $Pd_2Ir$—B catalyst particle was supported by a carbonaceous support and was prepared in the same manner as in Example 1, except that 50 g of a 0.1 wt % $IrCl_3$ aqueous solution was additionally used in preparing the precursor mixture. B was now present in the unit lattice of Pd and Ir at an atomic ratio of Pd:Ir:B at 2:1:3/20.

Example 3

Preparation of $Pd_5Ir$—B/C Catalyst

A $Pd_5Ir$—B/C catalyst, in which, theoretically, a 50 wt % $Pd_5Ir$—B catalyst particle was supported by a carbonaceous support and was prepared in the same manner as in Example 1, except that 20 g of a 0.1 wt % $IrCl_3$ aqueous solution was additionally used in preparing the precursor mixture. B was now present in the unit lattice of Pd and Ir at an atomic ratio of Pd:Ir:B of 5:1:6/20.

Example 4

Preparation of $Pd_5IrCo$—B/C Catalyst $Pd_5IrCo$—B/C catalyst, in which, theoretically, a 50 wt % $Pd_5IrCo$—B catalyst particle was supported by a carbonaceous support and was prepared in the same manner as in Example 3, except that 10 g of a 0.1 wt % $CoCl_2$ aqueous solution was additionally used in preparing the precursor mixture. B was now present in the unit lattice of Pd, Ir, and Co at an atomic ratio of Pd:Ir:Co:B of 5:1:0.5:6/20, Example 5

Preparation of $Pd_2IrCo$—B/C Catalyst

A $Pd_2IrCo$—B/C catalyst, in which, theoretically, a 50 wt % $Pd_2IrCo$—B catalyst particle was supported by a carbonaceous support and was prepared in the same manner as in Example 2, except that 10 g of a 0.1 wt % $CoCl_2$ aqueous solution was additionally used in preparing the precursor mixture. B was now present in the unit lattice of Pd, Ir, and Co at an atomic ratio of Pd:Ir:Co:B of 2:1:0.2:3/20.

Example 6

Preparation of $Pd_2IrMn$—B/C Catalyst

A $Pd_2IrMn$—B/C catalyst, in which, theoretically, a 50 wt % $Pd_2IrMn$—B catalyst particle was supported by a carbonaceous support, was prepared in the same manner as in Example 2, except that 10 g of a 0.1 wt % $MnCl_2$ aqueous solution was additionally used in preparing the precursor mixture. B was now present in the unit lattice of Pd, Ir, and Mn at an atomic ratio of Pd:Ir:Mn:B of 2:1:0.2:3/20.

Example 7

Preparation of $Pd_5IrCoCu$—B/C Catalyst

A $Pd_5IrCoCu$—B/C catalyst, in which, theoretically, a 50 wt % $Pd_5IrCoCu$—B catalyst particle was supported by a carbonaceous support and was prepared in the same manner as in Example 3, except that 5 g of a 0.1 wt % $CuCl_2$ aqueous solution and 5 g of a 0.1 wt % $CoCl_2$ aqueous solution were additionally used in preparing the precursor mixture. B was now present in a unit lattice of Pd, Ir, Co, and Cu at an atomic ratio of Pd:Ir:Co:Cu:B of 5:1:0.25:0.25:6/20)

Example 8

Preparation of $Pd_2Ir$—In/C Catalyst

A $Pd_2Ir$—In/C catalyst, in which, theoretically, a 50 wt % $Pd_2Ir$—In catalyst particle was supported by a carbonaceous support and was prepared in the same manner as in Example 2, except that 50 g of a 0.1 wt % $In(OH)_3$ aqueous solution was used instead of the $H_3BO_3$ aqueous solution in preparing the precursor mixture. In was present in the unit lattice of Pd and Ir at an atomic ratio of Pd:Ir:In of 2:1:0.2.

Example 9

Preparation of $Pd_5Ir$—In/C Catalyst

A $Pd_5Ir$—In/C catalyst, in which, theroetically, a 50 wt % $Pd_5Ir$—In catalyst particle was supported by a carbonaceous support and was prepared in the same manner as in Example 3, except that 50 g of a 0.1 wt % $In(OH)_3$ aqueous solution was used instead of the $H_3BO_3$ aqueous solution in preparing the precursor mixture. In was now present in the unit lattice of Pd and Ir at an atomic ratio of Pd:Ir:In of 5:1:0.5.

Comparative Example 1

Preparation of Pd/C Catalyst

A Pd/C catalyst, in which, theoretically, a 50 wt % Pd catalyst particle was supported by a carbonaceous support, was prepared in the same manner as in Example 1, except that the $H_3BO_3$ aqueous solution was not used in preparing the precursor mixture.

Comparative Example 2

Preparation of $Pd_2Ir$/C Catalyst

A $Pd_2Ir$/C catalyst, in which, theoretically, a 50 wt % $Pd_2Ir$ catalyst particle was supported by a carbonaceous support and was prepared in the same manner as in Example 2, except that the $H_3BO_3$ aqueous solution was not used in preparing the precursor mixture. The atomic ratio of Pd:Ir was 2:1.

Comparative Example 3

Preparation of $Pd_5Ir$/C Catalyst

A $Pd_5Ir$/C catalyst, in which, theoretically, a 50 wt % $Pd_5Ir$ catalyst particle was supported by a carbonaceous support and was prepared in the same manner as in Example 9, except that the $H_3BO_3$ aqueous solution was not used in preparing the precursor mixture. The atomic ratio of Pd:Ir was now 5:1.

Evaluation Example 1

Inductively Coupled Plasma (ICP) Analysis

Components of the catalysts prepared according to Examples 1 to 9 and Comparative Examples 1 to 3 were analyzed by ICP (ICP-AES, ICPS-8100, SHIMADZU/RF source 27.12 MHz/sample uptake rate 0.8 ml/min), and results thereof are shown in Table 1 below (metal contents were evaluated based on 100 wt % of the total weight of the catalyst.)

TABLE 1

| Catalyst | | Metal content (wt %) | | |
|---|---|---|---|---|
| | Pd | Ir | transition metal | Group 13 element |
| Example 1 | Pd—B/C | 49.3 | — | — | 0.34(B) |
| Example 2 | Pd$_2$Ir—B/C | 24.0 | 25.4 | — | 0.29(B) |
| Example 3 | Pd$_5$Ir—B/C | 38.8 | 14.2 | — | 0.09(B) |
| Example 4 | Pd$_5$IrCo—B/C | 34.9 | 13.8 | 7.3(Co) | 0.05(B) |
| Example 5 | Pd$_2$IrCo—B/C | 17.9 | 29.8 | 8.5(Co) | 0.04(B) |
| Example 6 | Pd$_2$IrMn—B/C | 18.2 | 28.9 | 6.2(Mn) | 0.06(B) |
| Example 7 | Pd$_5$IrCoCu—B/C | 34.3 | 13.0 | 5.3(Co) 7.8(Cu) | 0.2(B) |
| Example 8 | Pd$_2$Ir—In/C | 21.5 | 18.8 | — | 9.7(In) |
| Example 9 | Pd$_5$Ir—In/C | 33.3 | 12.9 | — | 11.8(In) |
| Comparative Example 1 | Pd/C | 50.5 | — | — | — |
| Comparative Example 2 | Pd$_2$Ir/C | 21.9 | 28.8 | — | — |
| Comparative Example 3 | Pd$_5$Ir/C | 36.6 | 13.9 | — | — |

Referring to Table 1, it was confirmed that unlike the catalysts prepared according to Comparative Examples 1 to 3, the catalysts prepared according to Examples 1 to 9 included the Group 13 element.

Evaluation Example 2

X-Ray Diffraction (XRD) Analysis

An XRD analysis (MP-XRD, Xpert PRO, Philips/Power 3 kW) was performed on the catalysts prepared according to Example 1, Comparative Example 1, Example 9, and Comparative Example 3. Results thereof are shown in FIGS. 4 and 5 and lattice constants of the respective catalyst are shown in Table 2 below:

TABLE 2

| Catalyst | | Lattice Constant |
|---|---|---|
| Example 1 | Pd—B/C | 3.894 |
| Comparative Example 1 | Pd/C | 3.893 |
| Example 9 | Pd$_5$Ir—In/C | 3.943 |
| Comparative Example 3 | Pd$_5$Ir/C | 3.877 |

Figure 4:
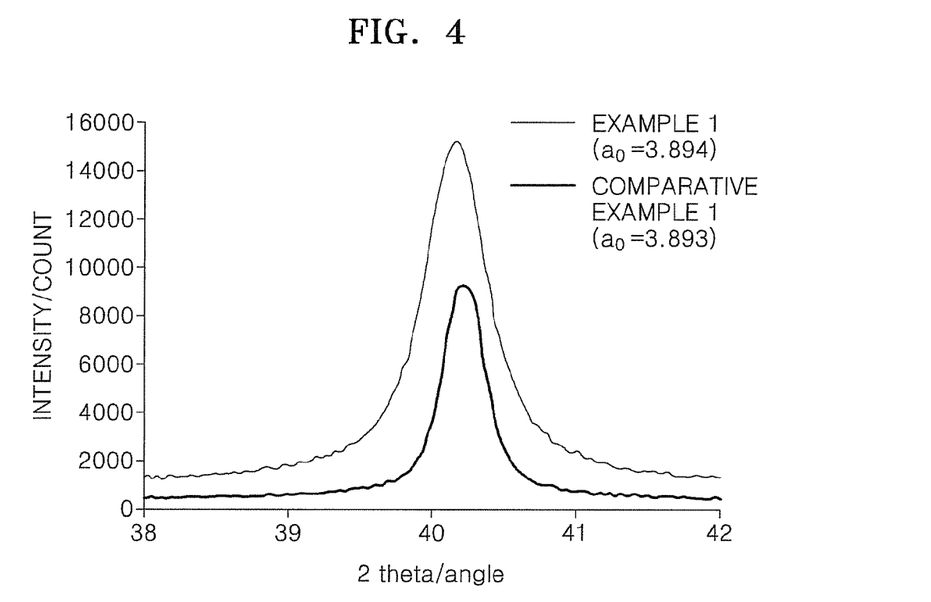
FIG. 4 shows X-ray diffraction patterns of catalysts prepared according to Example 1 and Comparative Example 1.
Figure 5:
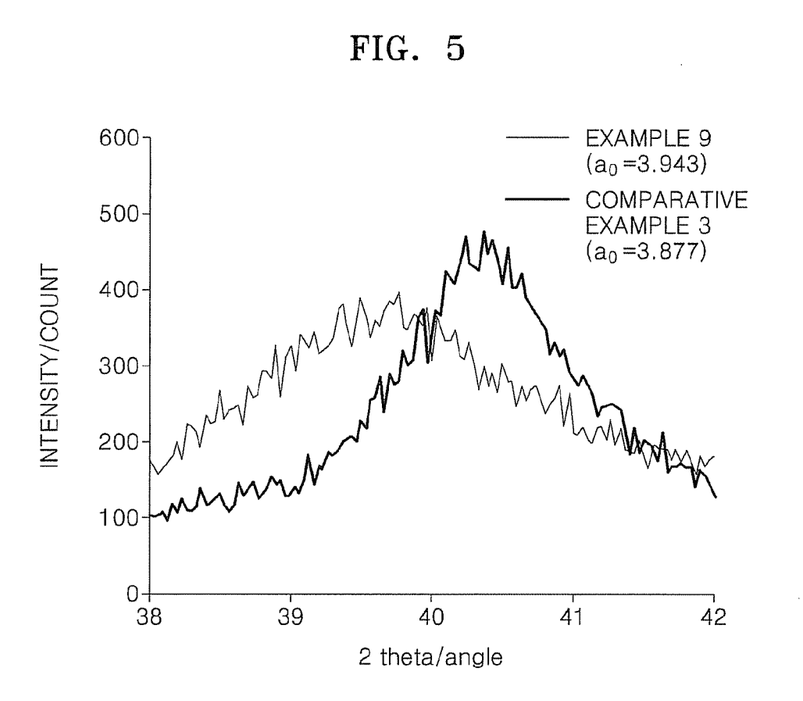
FIG. 5 shows X-ray diffraction patterns of catalysts prepared according to Example 9 and Comparative Example 3.

Referring to FIG. 4, the diffraction angle (2θ) of a (111) peak of the catalyst of Example 1 was less than the diffraction angle (2θ) of the (111) peak of the catalyst of Comparative Example 1. This result may be interpreted such that the B atom that was additionally included in the catalyst of Example 1 was inserted into the unit lattice of the catalyst of Example 1, thereby contributing to an increase in the distance between crystal surfaces that are parallel to each other in the unit lattice of the catalyst of Example 1. As a result, it was confirmed that, as shown in Table 2, the lattice constant of the catalyst of Example 1 is greater than the lattice constant of the catalyst of Comparative Example 1.

Referring to FIG. 5, the diffraction angle (2θ) of the (111) peak of the catalyst of Example 9 is less than the diffraction angle (2θ) of the (111) peak of the catalyst of Comparative Example 3. This result may be interpreted such that the In atom that was additionally included in the catalyst of Example 9 was inserted into the unit lattice of the catalyst of Example 9, thereby contributing to an increase in the distance between crystal surfaces that are parallel to each other in the unit lattice of the catalyst of Example 9. As a result, it was confirmed that, as shown in Table 2, the lattice constant of the catalyst of Example 9 is greater than the lattice constant of the catalyst of Comparative Example 3.

Evaluation Example 3

Catalyst Observation

Figure 6A:
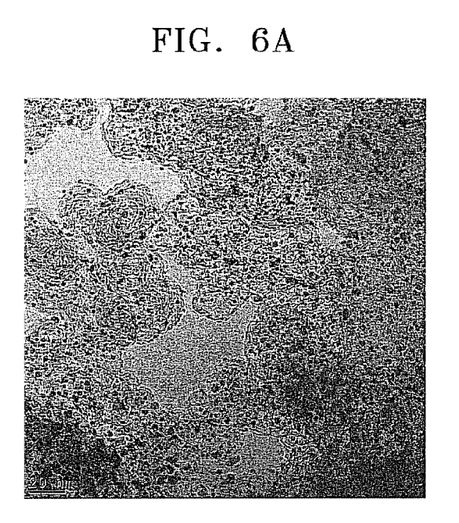
FIG. 6A shows a transmission electron microscope (TEM) image of a catalyst prepared according to Example 2.
Figure 6B:
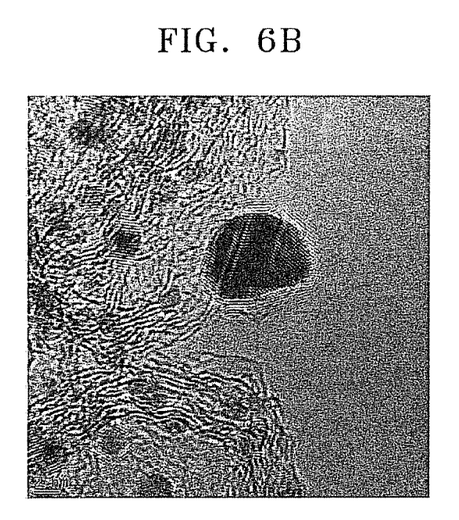
FIG. 6B shows a 10-times magnification of the TEM image of FIG. 6A.

The catalyst (Pd$_2$Ir—B/C) prepared according to Example 2 was observed with a transmission electron microscope (TEM), and results thereof are shown in FIGS. 6A and 6B (FIG. 6B is a 10-times magnified image of 6A). Referring to FIG. 6A, it was confirmed that catalyst particles of the catalyst prepared according to Example 2 were uniformly distributed in the carbonaceous support. It was also confirmed with reference to FIG. 6B that the catalyst particles of the catalyst prepared according to Example 2 have a lattice fringe and thus high crystallinity.

Evaluation Example 4

Oxygen Reduction Reaction (ORR) Evaluation

Fifteen μl of a mixture, including 0.02 g of the catalyst (Pd$_2$Ir—B/C) prepared according to Example 2, and 10 g of ethylene glycol, was dropped onto a glassy carbon electrode by using a micropipette and dried under decompression at a temperature of 80° C. Then, 15 μl of a 5 wt % NAFION® (DuPont Corp.) solution dispersed in ethylene glycol was dropped onto the electrode to which the catalyst had been dropped and dried in the same manner as described above, thereby completing the manufacture of a working electrode.

The working electrode was installed on a rotating disk electrode (RDE) device, and a Pt line as a counter electrode and Ag/AgCl (KCl$_{sat}$) as a reference electrode were prepared. The prepared 3-phase electrodes were placed in 0.1M HClO$_4$ electrolyte and were subjected to bubbling for 30 minutes by using nitrogen to remove residual oxygen in the solution. An electrolysis solution was saturated with oxygen by using a potentiostat and a galvanostat within a range of 0.03 to 1.2 V (vs. a Reversible Hydrogen Electrode or RHE), and then, while the carbon electrode was rotated, an ORR current was recorded in a negative direction from an open circuit voltage (OCV) to a potential where a material limiting current occurred.

Figure 7:
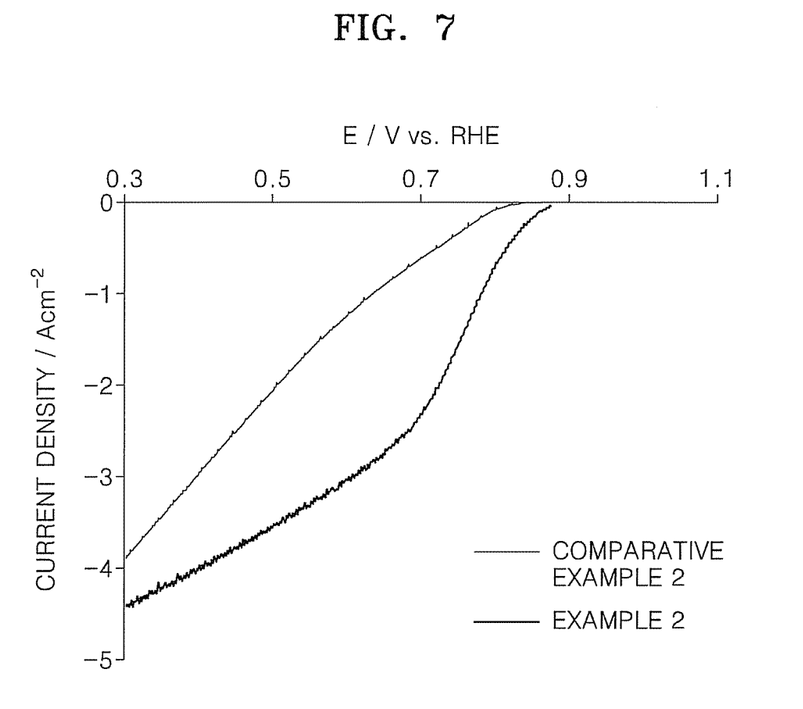
FIG. 7 shows oxygen reduction evaluation results of catalysts prepared according to Example 2 and Comparative Example 2.
Figure 8:
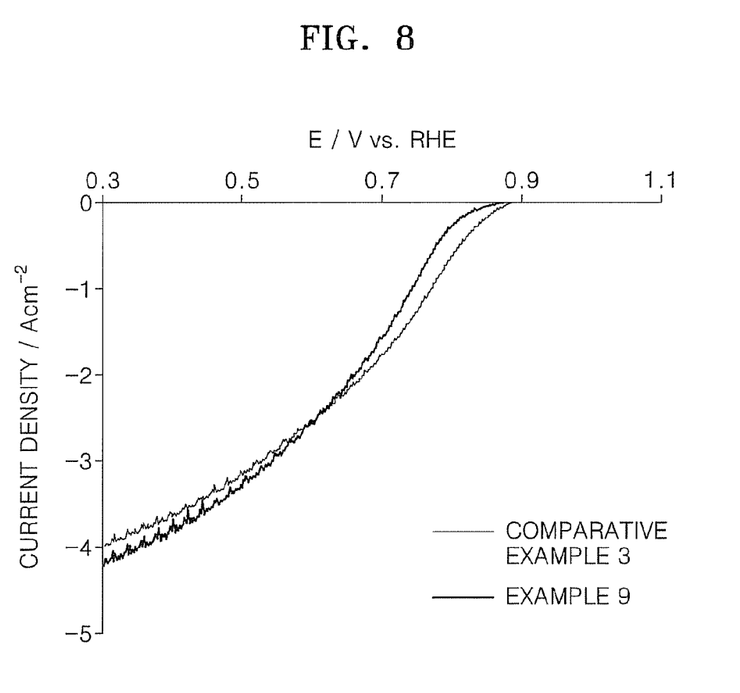
FIG. 8 shows oxygen reduction evaluation results of catalysts prepared according to Example 9 and Comparative Example 3.

The same method described above was used to record an ORR current except that instead of the catalyst of Example 2, the catalyst (Pd$_2$Ir/C) of Comparative Example 2, the catalyst (Pd$_5$Ir—In/C) of Example 9, and the catalyst (Pd$_5$Ir/C) of Comparative Example 3 were used. Results thereof are shown in FIGS. 7 and 8.

Oxygen reduction current values in an actual operation region of a fuel cell, that is, at about 0.7 V, were compared. As a result, it was confirmed that the oxygen reduction activities of the catalyst of Examples 2 and 9 were better than the oxygen reduction activities of the catalyst of Comparative Examples 2 and 3.

Evaluation Example 5

Unit Cell Performance Evaluation

Manufacture of Unit Cell 0.03 g of polyvinylidene fluoride (PVDF) per 1 g of the catalyst (Pd$_2$Ir—B/C) prepared according to Example 2 was mixed with an appropriate amount of a solvent, NMP, to prepare a cathode slurry. The cathode slurry was coated by using a bar coater on a sheet of carbon paper on which a microporous layer had been coated, and then dried while the temperature increased in phases from room temperature to 150° C., thereby completing the manufacture of a cathode. In the cathode, the loading amount of the catalyst of Example 2 was 1.5 mg/cm².

Separately, an anode was manufactured using a PtRu/C catalyst, and the loading amount of the PtRu/C catalyst in the anode was about 0.8 mg/cm².

A polybenzimidazole electrolyte membrane impregnated with 85 wt % phosphoric acid was interposed as an electrolyte membrane between the anode and the cathode, thereby completing the manufacture of an MEA.

Subsequently, instead of the catalyst of Example 2, the catalyst (Pd₂Ir/C) of Comparative Example 2 was used to manufacture an MEA.

Unit Cell Test

Figure 9:
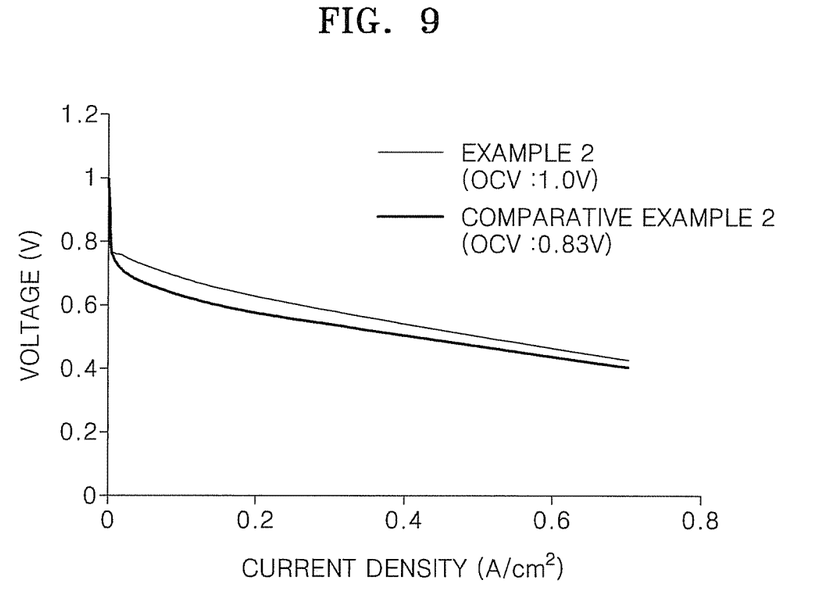
FIG. 9 shows electrical characteristics of unit cells including catalysts prepared according to Example 2 and Comparative Example 2.

Performances of the MEA including the catalyst of Example 2 and the MEA including the catalyst of Comparative Example 2 were evaluated using non-humidified air (250 cc/min) as the cathode and non-humidified hydrogen (100 cc/min) as the anode at a temperature of 150° C., and results thereof are shown in FIG. 9.

Referring to FIG. 9, it was confirmed that the OCV of the unit cell including the catalyst of Example 2 was higher than the OCV of the unit cell including the catalyst of Comparative Example 2. Because an OCV is related to an oxygen reduction reaction onset potential of a catalyst, it was confirmed that the performance of the MEA of the unit cell including the catalyst of Example 2 was higher than the performance of the MEA of the unit cell including the catalyst of Comparative Example 2.

As described above, according to the one or more of the above embodiments of the present invention, an electrode catalyst for a fuel cell has excellent oxygen reduction activity, and thus, enables an embodiment of a fuel cell to have low costs and high quality.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode catalyst for a fuel cell, the electrode catalyst comprising a crystalline catalyst particle comprising a Group 13 element and a precious metal having oxygen reduction activity, wherein the Group 13 element is present between atoms that form a unit lattice of the crystalline catalyst particle, the atoms that form the unit lattice comprise the precious metal and the crystalline catalyst particle does not comprise an oxygen atom.

2. The electrode catalyst of claim 1, wherein the precious metal comprises at least one of palladium (Pd), iridium (Ir), gold (Au), platinum (Pt), rhenium (Re), osmium (Os), ruthenium (Ru), rhodium (Rh), and silver (Ag).

3. The electrode catalyst of claim 1, wherein the precious metal comprises palladium (Pd).

4. The electrode catalyst of claim 1, wherein the precious metal comprises platinum (Pt).

5. The electrode catalyst of claim 1, wherein the Group 13 element comprises at least one of boron (B), aluminum (Al), gallium (Ga), indium (In), and thallium (Tl).

6. The electrode catalyst of claim 1, wherein the Group 13 element comprises at least one of boron (B) and indium (In).

7. The electrode catalyst of claim 1, further comprising a transition metal comprising at least one of cobalt (Co), copper (Cu), iron (Fe), nickel (Ni), manganese (Mn), cerium (Ce), and titanium (Ti).

8. The electrode catalyst of claim 7, wherein the transition metal comprises at least one of cobalt (Co), copper (Cu), and manganese (Mn).

9. The electrode catalyst of claim 1, wherein the electrode catalyst satisfies at least one of Equations 1 to 3 below:

$$D_2(X) > D_1(X) \qquad \text{<Equation 1>}$$

$$D_2(Y) > D_1(Y) \qquad \text{<Equation 2>}$$

$$D_2(Z) > D_1(Z) \qquad \text{<Equation 3>}$$

in Equations 1 to 3, $D_2(X)$, $D_2(Y)$, and $D_2(Z)$ respectively indicate distances parallel to the X-axis, the Y-axis, and the Z-axis among distances between crystal surfaces of the unit lattice of the crystalline catalyst particle that are parallel to each other, $D_1(X)$, $D_1(Y)$ and $D_1(Z)$ respectively indicate distances parallel to the X-axis, the Y-axis, and the Z-axis among distances between crystal surfaces of the unit lattice of a first catalyst particle that are parallel to each other, and the first catalyst particle has the same structure as the crystalline catalyst particle except that the Group 13 element is not included therein.

10. The electrode catalyst of claim 1, wherein the electrode catalyst satisfies Equation 4 below:

$$A2 > A1 \qquad \text{<Equation 4>}$$

and in Equation 4, A2 is a lattice constant of the crystalline catalyst particle and A1 is a lattice constant of a first catalyst particle that has the same structure as the crystalline catalyst particle except that the Group 13 element is not included therein.

11. The electrode catalyst of claim 1, further comprising a carbonaceous support.

12. The electrode catalyst of claim 1, wherein the amount of the Group 13 element is in a range of about 0.001 to about 20 parts by weight based on 100 parts by weight of the electrode catalyst.

13. A method of preparing an electrode catalyst for a fuel cell, the method comprising:
preparing a mixture comprising a precursor of a Group 13 element and a precursor of a precious metal having oxygen reduction activity; and
reducing the precursors in the mixture to form an electrode catalyst that is used in a fuel cell and comprises a crystalline catalyst particle incorporating a Group 13 element and a precious metal having oxygen reduction activity, wherein the Group 13 element is between atoms that form a unit lattice of the crystalline catalyst particle, the atoms that form the unit lattice comprise the precious metal and the crystalline catalyst particle does not comprise an oxygen atom.

14. The method of claim 13, wherein the precursor of the Group 13 element comprises at least one of chlorides, nitrides, cyanides, sulfides, bromides, nitrates, acetates, sulfates, oxides, hydroxides, salts of oxygen acids, and alkoxides, each of which is a salt of the Group 13 element.

15. The method of claim 13, wherein the mixture further comprises a carbonaceous support.

16. The method of claim 13, wherein the mixture further comprises at least one of a glycol-based solvent and an alcohol-based solvent.

17. A membrane electrode assembly for a fuel cell, the membrane electrode assembly comprising:
- a cathode;
- an anode disposed facing the cathode; and
- an electrolyte membrane interposed between the cathode and the anode, wherein at least one of the cathode and the anode comprises the electrode catalyst of claim 1.

18. The membrane electrode assembly of claim 17, wherein the cathode comprises the electrode catalyst.

19. A fuel cell comprising the membrane electrode assembly of claim 18.

* * * * *